(12) United States Patent
Kaya et al.

(10) Patent No.: US 11,647,532 B1
(45) Date of Patent: May 9, 2023

(54) ALGORITHM FOR MITIGATION OF IMPACT OF UPLINK/DOWNLINK BEAM MISMATCH

(71) Applicant: NOKIA SOLUTIONS AND NETWORKS OY, Espoo (FI)

(72) Inventors: Aliye Kaya, Chatham, NJ (US); Harish Viswanathan, Basking Ridge, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/988,402

(22) Filed: Nov. 16, 2022

(30) Foreign Application Priority Data

Nov. 17, 2021 (FI) ...................................... 20216179

(51) Int. Cl.
  *H04W 72/542* (2023.01)
  *H04W 72/044* (2023.01)

(52) U.S. Cl.
  CPC ....... *H04W 72/542* (2023.01); *H04W 72/046* (2013.01)

(58) Field of Classification Search
  CPC ............. H04W 72/542; H04W 72/543; H04W 72/046; H04W 72/0473
  See application file for complete search history.

(56) References Cited

U.S. PATENT DOCUMENTS

| | | |
|---|---|---|
| 2018/0102827 A1 | 4/2018 | Noh et al. |
| 2019/0372644 A1* | 12/2019 | Chen .................. G06N 3/08 |
| 2020/0358514 A1* | 11/2020 | Landis ................ G06N 3/044 |
| 2021/0280182 A1* | 9/2021 | Choi ................... H04R 3/005 |
| 2021/0402898 A1* | 12/2021 | Alvarez ............... G06V 10/82 |
| 2022/0014963 A1* | 1/2022 | Yeh .................... G06N 7/01 |
| 2022/0038146 A1* | 2/2022 | Mo .................... H04B 7/0482 |

FOREIGN PATENT DOCUMENTS

WO 2020/222998 A1 11/2020

OTHER PUBLICATIONS

Office Action dated Apr. 6, 2022 corresponding to Finnish Patent Application No. 20216179.
Finnish Search Report dated Apr. 6, 2022 corresponding to Finnish Patent Application No. 20216179.
Communication of Acceptance—section 29 a of Patents Decree dated Jun. 17, 2022 corresponding to Finnish Patent Application No. 20216179.

* cited by examiner

*Primary Examiner* — Dinh Nguyen
(74) *Attorney, Agent, or Firm* — Squire Patton Boggs (US) LLP

(57) ABSTRACT

According to an aspect, there is provided an apparatus for the performing the following. The apparatus implements, separately for at least one downlink beam, a reinforcement learning model, where a state defines which of the plurality of uplink beams belong to a priority beam set for uplink reception corresponding to a downlink beam, an action is defined as an addition of a new uplink beam to the priority beam set, a removal of an uplink beam from the priority beam set or doing nothing and a reward is calculated based on a change in uplink signal-to-noise ratio due to an action adjusted with a cost for taking the action. The apparatus calculates iteratively at least one optimal state using at least one reinforcement learning model based on uplink signal-to-noise ratio statistics and on the plurality of optimal downlink beams for transmission to said plurality of terminal devices.

19 Claims, 9 Drawing Sheets

ALGORITHM FOR MITIGATION OF IMPACT OF UPLINK/DOWNLINK BEAM MISMATCH

CROSS REFERENCE TO RELATED APPLICATION:

This application claims the benefit of Finnish patent application Ser. No. 20/216,179, filed Nov. 17, 2021. The entire content of the above-referenced application is hereby incorporated by reference.

TECHNICAL FIELD

Various example embodiments relate to wireless communications.

BACKGROUND

A 5G-NR access node (or gNodeB, gNB) determines the best downlink (DL) and uplink (UL) beams for a specific 5G-NR terminal device (or user equipment, UE) based on feedback received from the terminal device. Specifically, a 5G-NR terminal device measures the beams formed by the access node and reports the best beams as a UL transmission. At the terminal device, the received beam power is typically determined by averaging the received power from each access node transmit beam across all antennas of the terminal device. The beam with the highest received power is fed back to the access node as the best DL beam. That beam is also designated by default as the best UL beam (the beam used by the access node for receiving when the terminal device transmits in UL). However, most terminal devices use a single antenna for UL transmissions. The choice of which antenna to use for UL is left to the manufacturer of the terminal device and is not defined in standards. The orientation and location of the antennas of the terminal device may cause different received power statistics for transmission through each antenna. Therefore, the best beams derived based on average power statistics fed back by the terminal device may significantly differ from single antenna statistics although the UL and DL channels are reciprocal.

US2018102827 A1 discloses an apparatus of a base station (BS) of a 5G or pre-5G communication system. The BS may be configured to determine whether to use a beam of the BS and a beam of a terminal, which have been used in a downlink, in an uplink based on capability information received from the terminal and whether an antenna of the BS used for communication with the terminal is a transmission/reception common antenna and perform an uplink beam search when it is determined that the beam of the BS or the beam of the terminal is not used in the uplink.

BRIEF DESCRIPTION

According to an aspect, there is provided the subject matter of the independent claims. Embodiments are defined in the dependent claims. The scope of protection sought for various embodiments is set out by the independent claims.

The embodiments and features, if any, described in this specification that do not fall under the scope of the independent claims are to be interpreted as examples useful for understanding various embodiments.

BRIEF DESCRIPTION OF DRAWINGS

In the following, example embodiments will be described in greater detail with reference to the attached drawings, in which.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
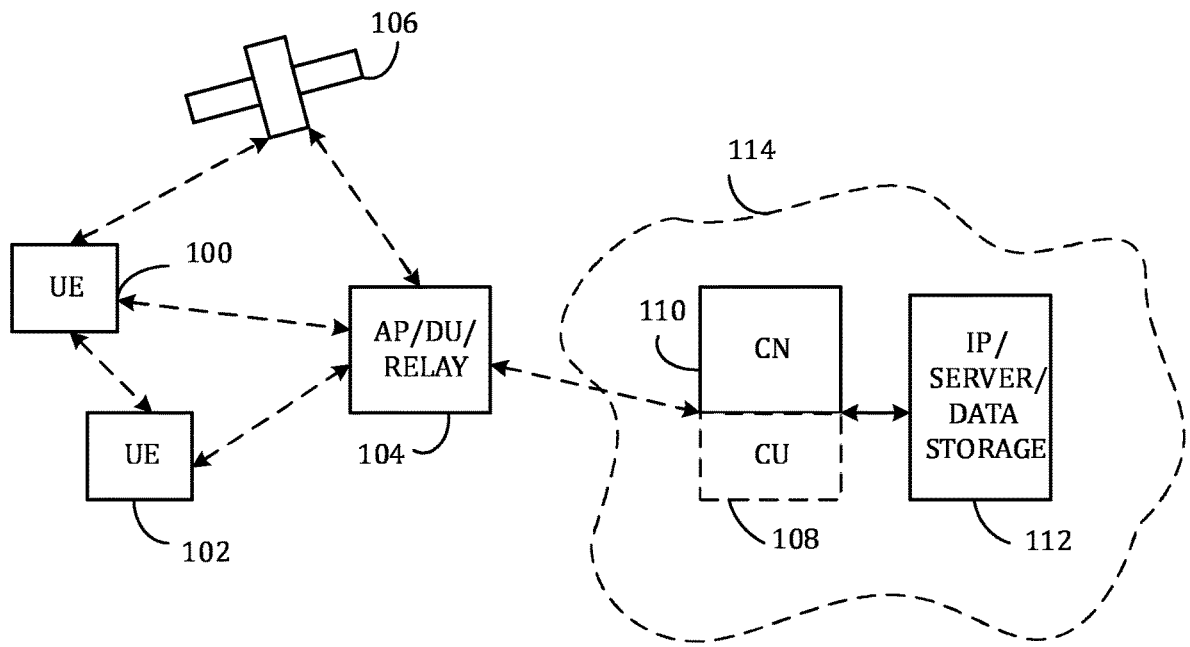
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices. The devices 100 and 102 are configured to be in a wireless connection on one or more communication channels with a node 104. The node 104 is further connected to a core network 110. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 110 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g., to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

A 5G-NR access node (or gNodeB, gNB) determines the best downlink (DL) and uplink (UL) beams for a specific 5G-NR terminal device (or user equipment, UE) based on feedback received from the terminal device. Specifically, a 5G-NR terminal device measures the beams formed by the access node and reports the best beams as a UL transmission. At the terminal device, the received beam power is typically determined by averaging the received power from each access node transmit beam across all antennas of the terminal device. The beam with the highest received power is fed back to the access node as the best DL beam. That beam is also designated by default as the best UL beam (the beam used by the access node for receiving when the terminal device transmits in UL). However, most terminal devices use a single antenna for UL transmissions. The choice of which antenna to use for UL is left to the manufacturer of the terminal device and is not defined in standards. The orientation and location of the antennas of the terminal device may cause different received power statistics for transmission through each antenna. Therefore, the best beams derived based on average power statistics fed back by the terminal device may significantly differ from single antenna statistics although the UL and DL channels are reciprocal.

The conditions for determining UL and DL beams at a transmission/reception point (TRP) (i.e., at an antenna array of an access node available to the network and located at a specific geographical location) is defined conventionally as follows. The Tx/Rx beam correspondence (i.e., DL/UL beam correspondence) at TRP holds if at least one of the following is satisfied:
  TRP is able to determine a TRP Rx beam for the UL reception based on DL measurement at the terminal device on one or more Tx beams of the TRP.
  TRP is able to determine a TRP Tx beam for the DL transmission based on UL measurement at the TRP on one or more Rx beams of the TRP.

Operating using the above beam correspondence can result in the mismatch problem as described above. If the TRP (i.e., the access node) sweeps through all of the beams to determine the best beam for (UL) reception, then the problem may not arise. However, that may not be feasible due to resource constraints or due to the channel fading statistics. For example, the best beam may change before the full sweep of the beams can be completed.

In most cases, the optimal DL beam determined by averaging the received power across all antennas of the terminal device is the same as the best UL beam. However, when the optimal DL and UL beams differ, the terminal device using an UL beam corresponding to the optimal DL beam may experience inferior UL link quality due to this mismatch. In the field, this may even lead to call drops. The access node may need to sweep all possible beams for UL reception until it finds a good UL beam. This comes with additional overhead and delay. Due to multipath, the optimal UL beam could differ from the adjacent beams to the optimal DL beam. Therefore, more sophisticated algorithms are needed.

Embodiments to be discussed seek to overcome the aforementioned problems by providing means for determining the one or more UL beams most likely to be optimal. Thus, in the case of a DL-UL mismatch, the optimal UL beam may be found efficiently without having to go through all the possible beams. Said one or more most likely UL beams are called in the following a priority beam set while the zero or more UL beams (typically, a plurality of UL beams) of the access node not in the priority beam set are called in the following a secondary beam set. Thus, the priority and secondary beam sets are disjoint set (i.e., sets with no common elements).

Figure 2:
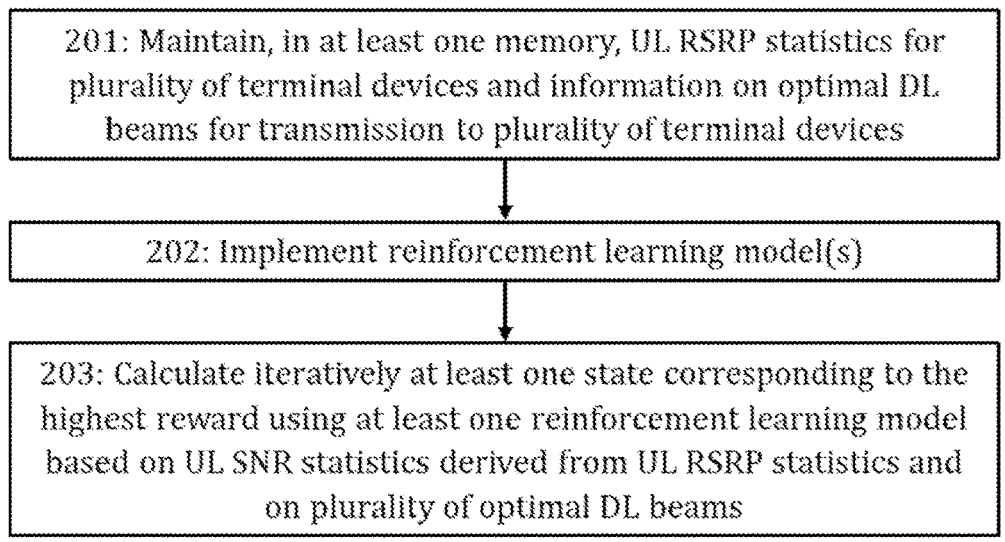
FIGS. 2 to 6 illustrate exemplary processes according to embodiments.

FIG. 2 illustrates a process according to embodiments for defining and training a reinforcement training-based model for determining the most likely UL beams for a given DL beam. The process of FIG. 3 may be carried out by an apparatus (e.g., a computing device). The apparatus may be, be comprised in or communicatively connected to an access node (e.g., an access node 104 of FIG. 1).

Referring to FIG. 2, the apparatus may initially maintain, in block 201, in at least one memory, UL reference signal received power (RSRP) statistics for signals measured using a plurality of UL beams of the access node from a plurality of terminal devices and a plurality of optimal DL beams of the access node for transmission to said plurality of terminal devices. Here, said at least one memory may comprise at least one (internal) memory of the apparatus and/or at least one external memory (i.e., a memory not forming an intrinsic part of the apparatus) such as a memory of an external storage device or a cloud-based memory or storage. Said plurality of optimal DL beams may be specifically beams which have been reported previously, respectively, by the plurality of terminal devices to the access node (and further to the apparatus) as being optimal for DL reception at a given terminal device. Thus, said at least one memory may comprise information for identifying, given a DL beam of the plurality of DL beams of the access node, a set of one or more terminal devices (later called source terminal device) for which said DL beam is optimal.

The RSRP statistics stored in said at least one memory may have been determined by the apparatus or the access node (or other entity) based on a plurality of physical uplink control channel (PUCCH), physical uplink shared channel (PUSCH) and/or sounding reference signal (SRS) measurements at the access node.

The RSRP statistics and information on the plurality of optimal DL beams may be stored, for example, in a table T. There may be no need to save information regarding the identities of the plurality of terminal devices from which reports have been received in said table. A new entry to the table is added, by the apparatus, to the table in response to a new RSRP measurement becoming available. Over time beams serving many users may have multiple entries in the table. A single entry of the table may comprise, e.g., at least the RSRP information of the measured UL beam(s) and a beam index (or some other identifier) of the optimal DL beam. The beam index may have, for example, an integer value corresponding to a particular DL beam of the plurality of DL beams of the access node.

In some embodiments, the apparatus may initially maintain, in block 201, in said at least one memory, uplink signal-to-noise ratio statistics derived or derivable from said uplink reference signal received power statistics, instead of or in addition to maintaining, in said at least one memory, said uplink reference signal received power statistics.

In other embodiments, block 201 may be omitted (e.g., said information may, instead of being maintained in said at least one memory, be obtained or retrieved from another device or from an external memory when it is needed for calculations such as for calculations of block 203).

The apparatus defines (or generates or establishes), in block 202, separately for at least one DL beam (or for each DL beam) of a plurality of DL beams of the access node, a reinforcement learning model.

A reinforcement learning model is, in general, characterized by the states, actions and rewards defined for it. Here, the states, actions and rewards of a reinforcement learning model corresponding to a particular DL beam are defined as follows.

A state of the reinforcement learning model defines which of the plurality of UL beams of the access node belong to a priority beam set for UL reception from one or more source terminal devices which reported said particular DL beam as the optimal DL beam. In other words, the state defines which of the plurality of UL beams are considered likely to correspond to the optimal UL beam for said one or more source terminal devices and which are not.

The state for an nth DL beam of the plurality of DL beams of the access node may be defined, for example, as a binary vector $b^n$ having a length N corresponding to the number of the plurality of UL beams of the access node (or equally of the plurality of DL beams of the access node). An element $b_i^n$ of the binary vector $b^n$ corresponds to an ith UL beam (i having integer values, e.g., from 1 to N or equally from 0 to N-1). Each element having a first value may correspond to the primary beam set while each element having a second value may correspond to the secondary beam set, where the first and second values are, respectively, 0 and 1 or 1 and 0. Obviously, corresponding functionalities may be implemented equally using a real- or integer-valued vector, where each of the priority and secondary beam sets are indicated with certain pre-defined value(s).

An action in a given state is defined as an addition of a new UL beam of the plurality of UL beams of the access node to the priority beam set, a removal of a UL beam from the priority beam set or doing nothing. It should be noted that the addition of a new UL beam to the priority beam set implies that an UL beam is moved from the secondary beam set to the priority beam set while the removal of a UL beam implies that the UL beam is moved from the priority beam set to the secondary beam set. The option of doing nothing is included here so as to be able to determine when an optimal solution is found (i.e., when doing nothing is the most beneficial action that can be taken).

An action may be defined more formally, for example, in the following manner. For each DL beam n and a corresponding state defined as a binary vector $b^n$, an action for an ith UL beam of the plurality of UL beams of the access node may be defined as an integer an having a value satisfying $-N \leq a_i^n \leq N$. Following actions may be defined:

Include the UL beam i in the priority beam set: $0 < a_i^n \leq N$.

Exclude the UL beam i from the priority beam set: $-N \leq a_i^n < 0$.

Do nothing: $a_i^n = 0$.

As an action is taken, the binary vector defining the priority beam set corresponding to an nth DL beam is transitioned from $b^n$ to $b'^n$. Binary vectors $b^n$ and $b'^n$ may differ only up to one element (i.e., $b'^n$ corresponds to $b^n$ ith a value of zero or one element changed from 0 to 1 or from 1 to 0). The modified binary vector may be defined, e.g., as follows:

$$b'^n = b^n + \frac{a_i^n}{|a_i^n|} e_i^n, \qquad (1)$$

where $e_i^n$ is an identity vector with ith element set to 1 and i is assumed to have a value from 1 to N.

A reward of taking an action in a given state is calculated based on a change in UL signal-to-noise ratio (SNR) statistics of one or more source terminal devices due to an action adjusted with a cost for taking that action. Here, the one or more source terminal devices are terminal devices for which a DL beam associated with the particular reinforcement learning model is the optimal DL beam (as described also above).

The cost may correspond to a positive, negative or zero cost depending on whether the action relates adding a UL beam to the priority beam set, removing a UL beam from the priority beams or doing nothing, respectively.

Additionally or alternatively, the change in the UL SNR statistics (called the SNR metric in the following) is defined as a dB-difference between Ath percentile signal-to-noise ratios after and before taking the action or as a sum or a weighted sum of a plurality of dB-differences between signal-to-noise ratios after and before taking the action calculated for different percentiles. A is, here, a positive real number smaller than or equal to 100.

A reward may be defined more formally, for example, in the following (deterministic) manner. The reward $R_{add}^n$ for adding a UL beam to the priority beam set may be defined for the nth reinforcement learning model (i.e., corresponding to the nth DL beam) as $$R_{add}^n = (\Delta SNR_{A\%}^n[dB] + \delta \Delta SNR_{B\%}^n[dB]) - \gamma_{add}[dB], \quad (2)$$

where $\Delta SNR_{A\%}$ is a dB-difference between Ath percentile signal-to-noise ratios after and before taking the action, $\Delta SNR_{B\%}$ is a dB-difference between Bth percentile signal-to-noise ratios after and before taking the action, $\delta$ is a positive scaling (or weighing) factor being equal to or smaller than 1, $\gamma$ is the cost for taking the action defined in dB and A is smaller than B (A<B). The terms $\Delta SNR_{A\%}$ and $\Delta SNR_{A\%}$ may correspond to a difference associated with a change from a state b to a modified state b' (as defined above). Parameters A and B are positive real numbers smaller than or equal to 100. Parameters A and B have different values. A may have a value selected from a range 0-50 and/or B may have a value selected from a range 50-100. For example, A may have a value of 5 and/or B may have a value of 50. The cost parameter $\gamma_{add}$ is defined to be zero or positive (i.e., adding a UL beam to the priority beam set is associated with a positive cost).

While not explicitly shown in the equation (2), the terms $\delta$ and/or $\gamma_{add}$ may optionally be defined differently for different reinforcement learning models (i.e., for different n).

Since adding a beam will always improve or not change the SNR values, the marginal improvement due to adding a UL beam defined by the SNR metric $\Delta SNR_{A\%}^n[dB] + \delta \Delta SNR_{B\%}^n[dB]$ is always either positive or zero. The cost term $\gamma_i$ defines the minimum required improvement in said SNR metric $\Delta SNR_{A\%}^n[dB] + \delta \Delta SNR_{B\%}^n[dB]$ for including beam i in the priority beam set. The cost term $\gamma_n$ could also be regarded as the marginal fixed cost of moving a beam i to the priority beam set. The idea is that we do not want to add a UL beam to the priority beam set if the associated reward is incremental (i.e., too small to make much of a difference in SNR). Likewise, we do not want to keep a UL beam in the priority beam set if its removal only slightly changes the SNR.

Specifically, the terms $\Delta SNR_{A\%}$ and $\Delta SNR_{B\%}$ may be defined as $$\Delta SNR_{A\%}^n = SNR_{A\%}^{b'^n}[dB] - SNR_{A\%}^{b^n}[dB], \quad (3)$$

$$\Delta SNR_{B\%}^n = SNR_{B\%}^{b'^n}[dB] - SNR_{B\%}^{b^n}[dB], \quad (4)$$

where $SNR_{A\%}^{b^n}$ and $SNR_{A\%}^{b'^n}$ correspond, respectively, to the Ath percentile signal-to-noise ratios before and after taking an action changing the state from $b_n$ to $b'''$ and $SNR_{B\%}^{b^n}$ and $SNR_{A\%}^{b'^n}$ correspond, respectively, to the Bth percentile signal-to-noise ratios before and after taking an action changing the state from $b_n$ to $b'''$. It should be noted that, given the above definitions, adding a UL beam to the priority beam set will always improve or not change the SNR while removing an UL beam from the priority beam set will always decrease or not change the SNR.

Correspondingly, the reward $R_{remove}^n$ for removing a UL beam from the priority beam set may be defined for the nth reinforcement learning model (i.e., corresponding to the nth DL beam) as $$R_{remove}^n = (\Delta SNR_{A\%}[dB] + \delta \Delta SNR_{B\%}[dB]) - \gamma_{remove}[dB]. \quad (5)$$

Here, the terms in equation (5) may be defined as described above for equation (2). The only difference between the equations (2) & (5) is the different definition of the cost parameters. Here, the cost parameter $\gamma_{remove}$ is assumed to be zero or negative (i.e., adding a UL beam to the priority beam set is associated with a negative cost or positive gain). Since removing a UL beam from the priority beam set will always degrade or not change the SNR values, the SNR metric $\Delta SNR_{A\%} + \delta \Delta SNR_{B\%}$ (and each of the two terms is therein) is negative or zero. The reward for removing is a UL beam is positive only if this degradation is fully compensated by the positive term $-\gamma_{remove}$. If said reward is negative, it is desirable to keep that UL beam in the priority beam set. As an example, if we do not want to remove the beam i which would cause degradation to said SNR metric by more than 0.25 dB, the loss parameter $\gamma_{remove}$ may be defined to have a value of -0.25 dB (i.e., the term $-\gamma_{remove}$ may be defined to have a value of 0.25 dB).

The reward $R_0$ for doing nothing (implying a change of the state from $b''$ to $b'''=b''$) may be defined (for all n) simply as $$R_0 = 0. \quad (6)$$

It should be noted that this is consistent with the equations (2) and (5) as, in the case of doing nothing, the SNR metric $\Delta SNR_{A\%} + \delta \Delta SNR_{B\%}$ is zero and also it makes sense not to attribute any cost to remaining in the same state.

In summary, the reward may be written alternatively as $$R^n = (\Delta SNR_{A\%}[dB] + \delta \Delta SNR_{B\%}[dB]) - \gamma[dB], \quad (7)$$

where we have $$\begin{cases} \gamma > 0 \text{ for adding a } UL \text{ beam} \\ \gamma < 0 \text{ for removing a } UL \text{ beam} \\ \gamma = 0 \text{ for doing nothing.} \end{cases}$$

As mentioned above, a different weighted sum of a plurality of dB-differences of between signal-to-noise ratios after and before taking the action calculated for different percentiles may be used, in other embodiments, for defining the reward. More generally, the reward may, thus, be defined as $$R^n = \sum_{j=1}^{J} (\delta_j \Delta SNR_j[dB]) - \gamma[dB], \quad (7)$$

where we have $$\begin{cases} \gamma > 0 \text{ for adding a } UL \text{ beam} \\ \gamma < 0 \text{ for removing a } UL \text{ beam} \\ \gamma = 0 \text{ for doing nothing.} \end{cases}$$

and further J is a positive integer defining the number of different dB-difference terms, $\delta_j$ are pre-defined positive scaling (or weighing) factors and $\Delta SNR_j$ are dB-differences between a certain pre-defined (different) percentile signal-to-noise ratios after and before taking the action. For example, J may be equal to two or at least two. Note that the case J=2 with $\delta_1$=1 corresponds to the equation (7).

The apparatus calculates, in block 203, iteratively at least one optimal state (defining, respectively, at least one optimal priority beam set) using at least one (respective) reinforcement learning model based on (relevant) UL SNR statistics derived from the UL RSRP statistics maintained in said at least one memory and further based on the plurality of optimal DL beams for transmission to said plurality of terminal devices (or at least a part thereof). In other words, at least one optimal state is learned in block 203.

An optimal state corresponds to an end state following a convergence of a reinforcement learning model and defines as a set of one or more UL beams which are to be prioritized in UL reception when transmission is performed using a particular DL beam. It should be noted that the number of UL beams defined in the (final) priority beam set (i.e., the optimal state) depends on the relevant SNR (or RSRP) statistics (i.e., said number is not pre-defined).

The information on the plurality of optimal DL beams for transmission to said plurality of terminal devices is used, in block 203, specifically for determining said one or more source terminal devices corresponding to the DL beam associated with a given reinforcement learning model. The definition of said one or more source terminal devices, in turn, defines along with the current state which UL RSRP statistics are relevant for calculating the SNR statistics and based thereon the reward.

The calculation using a given reinforcement learning model associated with a given DL beam may start from an initial state defined as a random state or defined using one or more pre-defined criteria. Said one or more pre-defined criteria may, for example, define the initial state to be a state where only a UL beam matching said DL beam is included in the priority beam set or as a state where UL beam matching said DL beam and, additionally, one or more adjacent beams to said UL beam is included in the priority beam set).

The calculation using the reinforcement learning model(s) may employ here a so-called brute force approach as the number of possible actions for a given state is, in most practical cases, relatively limited and since the calculation may be carried out offline. In other words, rewards for all possible actions from a given state may be calculated at each iterative step of the calculation process as will be described in detail in the following in connection with FIG. 3.

In some embodiments where the apparatus does not form a part of the access node but is communicatively connected to it (e.g., via one or more wired and/or wireless communication links and/or one or more wired and/or wireless communication networks), the apparatus may cause transmission of information on one or more optimized states calculated in block 203 (defining the priority and secondary beam sets associated with one or more respective DL beams) to the access node. In some other embodiments where the apparatus forms a part of the access node, the apparatus may store said information to at least one memory of the access node (or at least accessible by the access node). In either case, the access node (or a part thereof) may subsequently use said information for optimizing the performing of beam sweeping as will be described in detail below.

Figure 3:
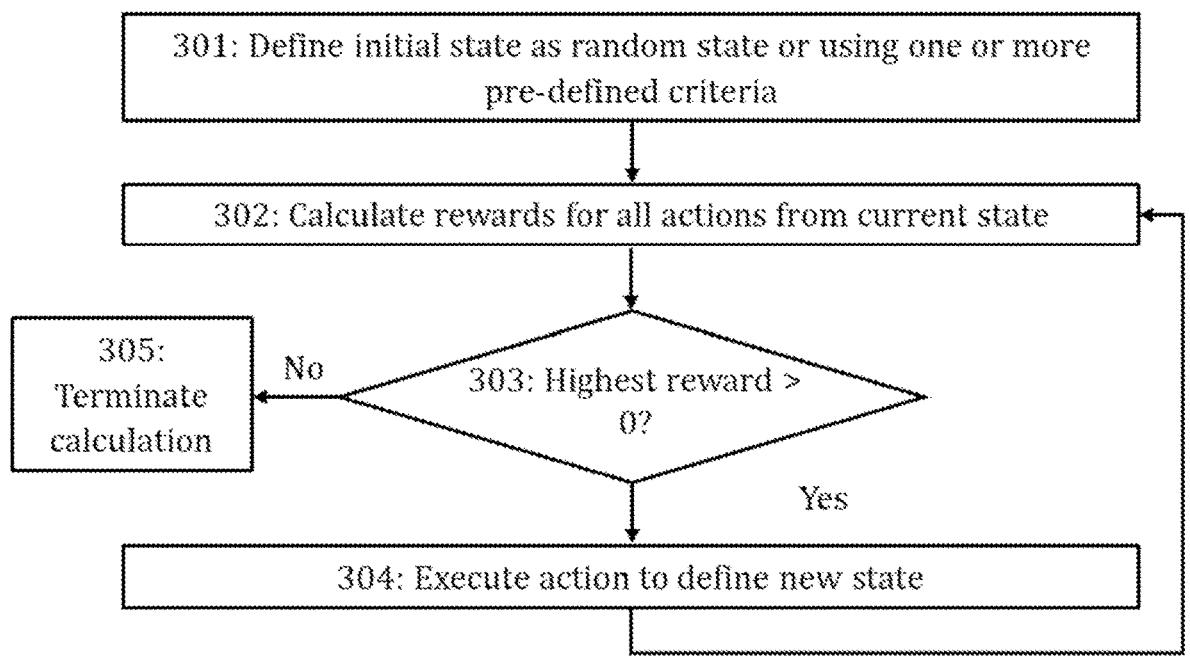

FIG. 3 illustrates, in more detail, an exemplary process according to embodiments for using a reinforcement learning model for determining the UL beams most likely to be optimal for a given set of source terminal devices which share the same optimal DL beam. The process of FIG. 3 may be carried out by an apparatus (e.g., a computing device). The apparatus may be, be comprised in or communicatively connected to an access node (e.g., an access node 104 of FIG. 1). The process of FIG. 3 may correspond to a more detailed view of block 203 of FIG. 2 for a single reinforcement learning model. Thus, any of the definitions provided in connection with FIG. 2 may apply also here.

Firstly, it should be noted that FIG. 3 illustrates for simplicity the process for a single reinforcement learning model. As described above, a separate reinforcement learning model may be provided for each of the plurality of DL beams of the access node (or at least some of them). The calculation is the same for all reinforcement learning models with the only difference being the RSRP (or SNR) statistics used (only the RSRP statistics relating to the one or more source terminal devices which considered a particular DL beam as the optimal DL beam are used for a calculation using a reinforcement learning model associated with said DL beam). Thus, the illustrated process may be carried out either in parallel and/or consecutively for a plurality of reinforcement learning models associated with a plurality of DL beams.

Referring to FIG. 3, the apparatus defines, in block 301, an initial state as a random state or using one or more pre-defined criteria, as described above.

Then, the apparatus calculates, in block 302, for a plurality of actions from said initial state, a plurality of rewards using the reinforcement learning model based on UL SNR statistics of one or more source terminal devices for which the DL beam associated with the reinforcement learning model is the optimal DL beam. The plurality of rewards may correspond to rewards associated with actions of adding each UL beam in the secondary beam set to the priority beam set, of removing each UL beam from the priority beam set (and adding them to the secondary beam set) and of doing nothing.

The calculation of a reward of the plurality of rewards for a given state and a given action of a reinforcement learning model (or equally for a given DL beam), in block 302, may be performed in two steps. First, the apparatus determines SNR statistics for the current state and the new state resulting from performing of the action based on the relevant UL RSRP statistics. The relevant UL RSRP statistics for the current state are here UL RSRP statistics relating to the one or more source terminal devices associated with said DL beam and to the UL beam(s) defined by the current state (i.e., the current priority beam set). Similarly, the relevant UL RSRP statistics for the new state are here UL RSRP statistics relating to the one or more source terminal devices associated with said DL beam and to the UL beam(s) defined by the new state (i.e., the new priority beam set). In other words, the UL RSRP statistics maintained in said at least one memory are effectively filtered based on the information on the one or more source terminal devices (associated with a particular optimal DL beam) and the current and the new state. Then, the cumulative distribution functions (CDFs) of the SNR for the current state and the new state may be calculated over all the relevant UL RSRP statistics. From the CDF, the different SNR statistics such as 5th percentile SNR and median SNR may be determined. Second, the apparatus calculates the reward based on a change in the UL SNR statistics between the current state and the new state adjusted with the cost for taking the action. This calculation may be carried out, for example, using any of the equations (2), (5) and (6). This two-step process is repeated for each of the plurality of possible actions from said given state though, obviously, the SNR statistics for the current state need to be derived only once for calculating the plurality of rewards.

The apparatus determines, in block 303, whether the highest reward of the plurality of rewards calculated in block 302 is larger than zero. In other words, it is determined, in block 303, whether or not the action of doing nothing (having a reward of zero) corresponds to the highest reward (implying that all the other actions are associated with zero or negative rewards). If the highest reward is equal to zero, the apparatus determines that it has found the optimal state and thus terminates, in block 305, the calculation process.

If the highest reward is not equal to zero, the apparatus executes, in block 304, the action of the plurality of actions associated with the highest reward so as to define a new state. In other words, the apparatus either adds a new UL beam to the priority beam set or removes a UL beam from the priority beam set in block 304 leading to the new state. The calculation of the new state b''' based on the current state b'' and the action $a_i$ (and index i) corresponding to the highest reward may be carried out, e.g., according to the equation (1). Subsequently, the process pertaining to blocks 302 to 304 is repeated until the highest reward of a plurality of calculated rewards is zero in block 303.

Figure 4:
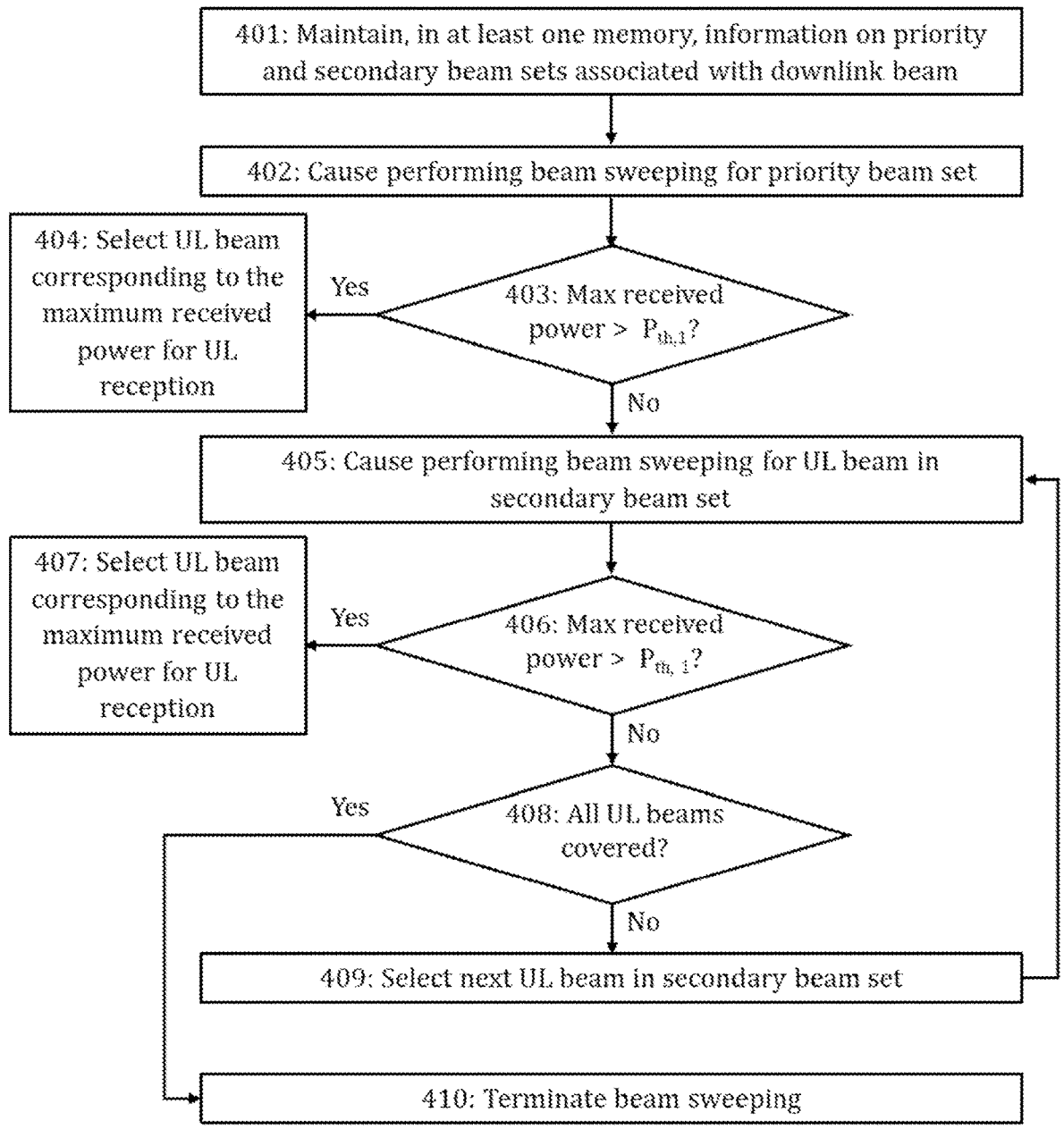

FIG. 4 illustrates a process according to embodiments for performing UL beam selection using beam sweeping (or equally probing) at an access node using the priority beam set (and the secondary beam set) and the associated DL beam. As described above, the optimal DL beam does not necessarily correspond to the optimal UL beam and thus the selection of the optimal UL beam is not a trivial task. The process of FIG. 4 may be carried out by an apparatus (e.g., a computing device). The apparatus may be, be comprised in or communicatively connected to an access node (e.g., an access node 104 of FIG. 1). The apparatus carrying out the process of FIG. 4 may the same or different apparatus compared to the apparatus configured to perform the process of FIG. 3 or 4.

Referring to FIG. 4, the apparatus maintains, in block 401, in at least one memory, information on a priority beam set of one or more UL beams of an access node and on a secondary beam set of one or more UL beams of the access node. Here, said at least one memory may comprise at least one (internal) memory of the apparatus and/or at least one external memory (i.e., a memory not forming an intrinsic part of the apparatus) such as a memory of an external storage device or a cloud-based memory or storage The priority and secondary beam sets are associated with a particular DL beam of the access node. The priority beam set may consist of a proper or strict subset of a plurality of UL beams of the access node associated with a particular DL beam of the access node (i.e., not all possible UL beams are in the priority beam set). As described above, each UL beam provided by the access node may belong to one of the priority and secondary beam sets (and thus only one of the priority and secondary beam sets needs to be explicitly defined assuming that the plurality of UL beams producible by the access node are known). Said information on the priority and secondary beam sets may be provided, for example, in the form of a binary vector b'' (n having an integer value within the range 1-N matching said DL beam, where N is the number of the plurality of DL beams provided by the access node), as described in connection with above embodiments.

In general, the apparatus may maintain, in at least one memory, information on a plurality of priority beam sets of one or more UL beams and on a corresponding plurality of secondary beam sets of one or more UL beams, where each pair of priority and secondary beam sets is associated with a particular DL beam of the access node. In such a case, said information on the plurality of priority and secondary beam sets may be provided, for example, in the form of a set of binary vectors $b^1, b^2, \ldots, b^N$ (or a subset thereof), as described in connection with above embodiments. The following discussion is limited to beam sweeping associated with a single DL beam for simplicity though obviously the discussed process may be carried out, in general, separately for a plurality of priority and secondary beam sets associated with a respective plurality of DL beams of the access node.

Based on said information maintained in said at least one memory, the apparatus determines, in blocks 402 to 410, an optimal beam for UL reception from one or more terminal devices to which said DL beam is used for transmission by performing the following. Initially, the apparatus causes performing, in block 402, beam sweeping, at the access node, with the one or more terminal devices using the priority beam set (i.e., using each of said one or more UL beams therein in turn). All the UL beams in the priority beam set may be swept before the process proceeds to block 403.

The beam sweeping may be carried out using any conventional beam sweeping scheme for evaluating received power at the access node using different UL beams. The beam sweeping may comprise, for example, scheduling one or more SRS transmissions by at least one of said one or more terminal devices associated with said DL beam. The one or more SRSs are measured, at the access node, using one or more different UL beams in the priority beam set, respectively. Alternatively, the beam sweeping may comprise changing the UL beam for reception of each PUCCH or PUSCH transmission to match each of the UL beams in the priority beam set in turn.

The apparatus determines, in block 403, whether a maximum received power measured for the priority beam set is above a first pre-defined power threshold following the completion of the beam sweeping for the priority beam set. The first pre-defined power threshold is denoted in FIG. 4 as $P_{th,1}$. If the first pre-defined power threshold is exceeded, the apparatus selects, in block 404, a UL beam corresponding to the maximum received power measured for the priority beam set as the optimal beam for UL reception.

In response to the maximum received power measured for the priority beam set failing to exceed the first pre-defined power threshold in block 403, the apparatus causes performing, in block 405, beam sweeping, at the access node, with the one or more terminal devices using the secondary beam set (one beam at a time). In other words, the apparatus causes initially performing, in block 405, beam sweeping for a first UL beam of the secondary beam set.

In response to a maximum received power measured for the (initial) UL beam in the secondary beam set exceeding the first pre-defined power threshold in block 406, the apparatus selects, in block 407, said UL beam of the secondary beam set as the optimal beam. Thus, the beam sweeping of the secondary beam set (and the UL beam selection process in general) is effectively terminated or stopped (before going through all the secondary beams).

In response to a maximum received power measured for the (initial) UL beam in the secondary beam set failing to exceed the first pre-defined power threshold in block 406, the apparatus checks, in block 408, whether all the UL beams in the secondary beam set have been covered. If this is not the case, the apparatus selects, in block 409, the next UL beam from the secondary beam set for beam sweeping. Then, the apparatus repeats actions pertaining to blocks 405 to 408 for the new UL beam.

Once it is determined in block 408 that all the UL beams in the secondary beam set have been covered by the process (and no UL beam satisfying the required criterion has been found), the apparatus may terminate, in block 410, the UL beam selection process without selecting an optimal beam for UL reception. In such a case, no UL beam provided by the access node may provide sufficiently high quality connection to the one or more source terminal device associated with a given downlink beam.

The beam selection as described in connection with FIG. 4 has the benefit of reducing resource overhead and latency as the priority beam set may be kept relatively small (relative to the total number of UL beams provided by the access node) and thus quick and easy to probe. In other words, using the beam selection scheme according to embodiments, the apparatus (or the access node) has to, in most cases, only probe a small subset of the UL beams of the access node. The priority (and secondary) beam set may also be easily updated regularly or periodically.

In some embodiments, the UL beam currently used by the access node may be omitted from the beam sweeping in block 402 or 405 (depending on whether said UL beam belongs to the priority or secondary beam set) as the maximum received power may already be known for said current UL beam.

In some embodiments, the beam selection procedure may be limited to selection from the priority beam set. In other words, the process may comprise blocks 401 to 404 (with optionally only priority beam set information being maintained in block 401).

While in FIG. 4 the secondary beam set was swept (block 405) and the results were checked for satisfying the power condition (block 406) one UL beam at a time for expediting the finding of a new satisfactory UL beam, in other embodiments, all the UL beams in the secondary beam set may be, first, swept and only then may the satisfying of the power condition be evaluated, similar to as described for the priority beam set.

Figure 5:
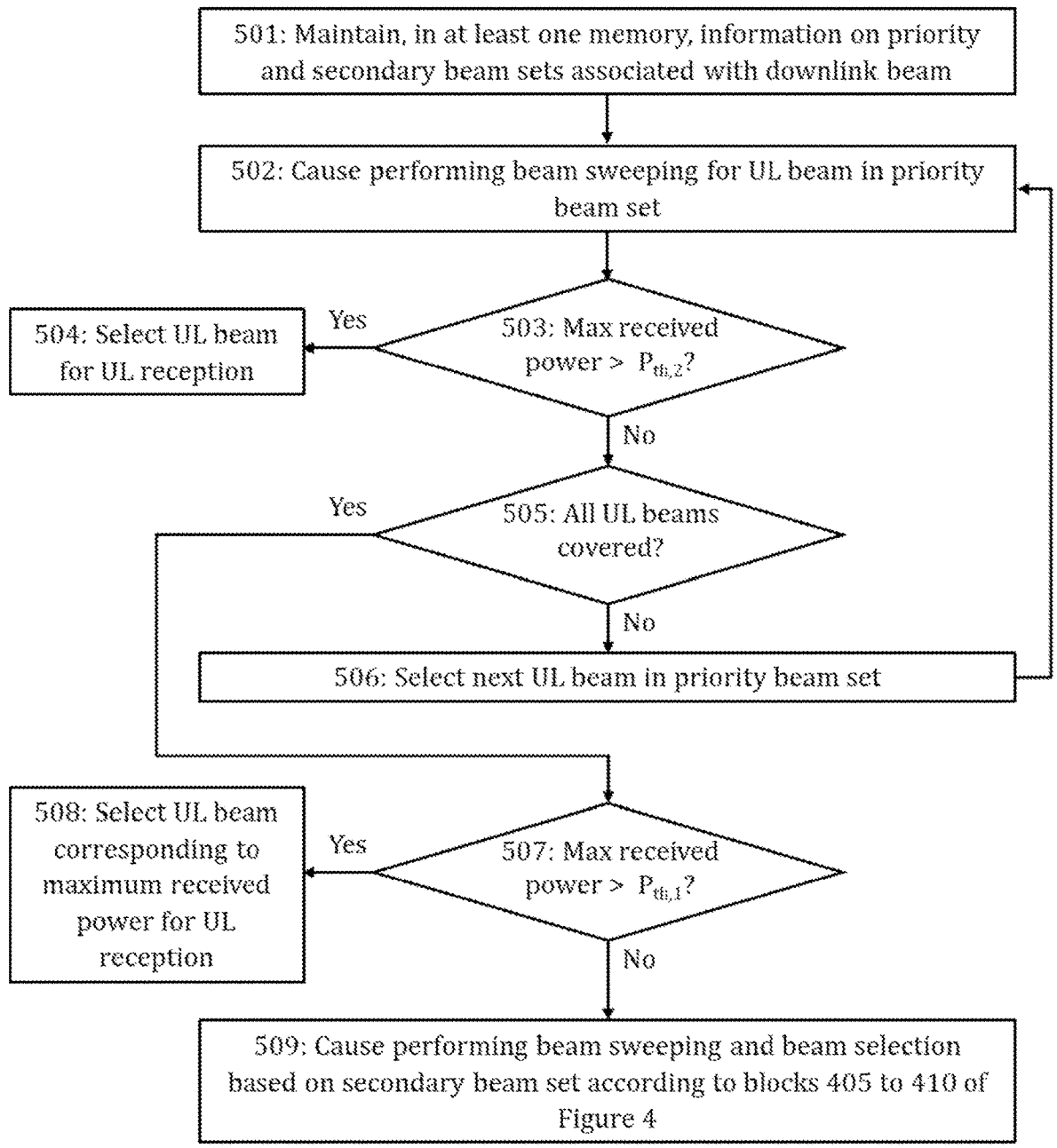

FIG. 5 illustrates another process according to embodiments for performing UL beam selection using beam sweeping (or equally probing) at an access node using the priority beam set (and the secondary beam set). The process of FIG. 5 may be carried out by an apparatus (e.g., a computing device). The apparatus may be, be comprised in or communicatively connected to an access node (e.g., an access node 104 of FIG. 1). The apparatus carrying out the process of FIG. 5 may the same or different apparatus compared to the apparatus configured to perform the process of FIG. 3 or 4.

The process of FIG. 5 corresponds, to a large extent, to the process of FIG. 4. Namely, blocks 501, 507, 508 may correspond fully to block 401, 403, 404 of FIG. 4. Moreover, the beam sweeping and beam selection based on the secondary beam set may be carried out, in block 509, as described above in connection with blocks 405 to 410 of FIG. 4. The blocks are, thus, not discussed here (again) for brevity.

The difference between the processes of FIGS. 4 and 5 lies in the additional UL beam selection check included in blocks 504, 505 of FIG. 5. Namely, similar to as described above for the secondary beam set, the priority beam set is evaluated per UL beam in addition to the aforementioned evaluation following the completion of the whole beam sweep for the priority beam set.

Initially, the apparatus causes performing, in block 502, beam sweeping, at the access node, with one or more terminal devices using the priority beam set (one beam at a time). In other words, the apparatus causes initially performing, in block 502, beam sweeping for a first UL beam of the priority beam set.

In response to a maximum received power measured for the (initial) UL beam in the priority beam set exceeding a second pre-defined power threshold in block 503, the apparatus selects, in block 504, said UL beam of the secondary beam set as the optimal beam. Here, the second pre-defined power threshold may be defined to be higher than the first pre-defined power threshold (i.e., the power requirement is stricter in this case). The second pre-defined power threshold may be defined such that it is expected that even if a better UL beam exists in the priority beam set or the secondary beam set than the one selected based on the second pre-defined power threshold, said better UL beam would be able to provide only marginal benefit (i.e., marginally better gain) compared to the selected UL beam. In other words, satisfying the second pre-defined power threshold indicates that the UL beam in question is a particularly suitable beam. The selection of the UL beam in block 504 effectively terminates or stops the beam sweeping of the priority beam set (before going through all the beams therein).

In response to a maximum received power measured for the (initial) UL beam in the priority beam set failing to exceed the second pre-defined power threshold in block 503, the apparatus checks, in block 505, whether all the UL beams in the priority beam set have been covered. If this is not the case, the apparatus selects, in block 506, the next UL beam from the priority beam set for beam sweeping. Then, the apparatus repeats actions pertaining to blocks 502 to 506 for the new UL beam.

Once it is determined in block 505 that all the UL beams in the priority beam set have been covered by the process (and no UL beam satisfying the required criterion has been found in block 503), the apparatus carries out UL beam selection based on the priority beam set as described in connection with blocks 403, 404 of FIG. 4.

Thus, the apparatus determines, in block 507, whether a maximum received power measured for the priority beam set (as a whole) is above a first pre-defined power threshold (defined to be lower than the second pre-defined power threshold) following the completion of the beam sweeping for the priority beam set. It should be noted that the maximum received power measured for the one or more UL beams of the priority beam set as determined in block 507 fails, by necessity, to exceed the second pre-defined power threshold as otherwise the UL beam selection in blocks 503, 504 would have been triggered. If the first pre-defined power threshold is exceeded, the apparatus selects, in block 508, a UL beam corresponding to the maximum received power measured for the priority beam set as the optimal beam for UL reception.

In response to the maximum received power measured for the priority beam set failing to exceed the first pre-defined power threshold in block 507, the apparatus causes performing, in block 509, beam sweeping and beam selection based on the secondary beam set as discussed previously in connection with FIG. 4, as mentioned above.

Figure 6:
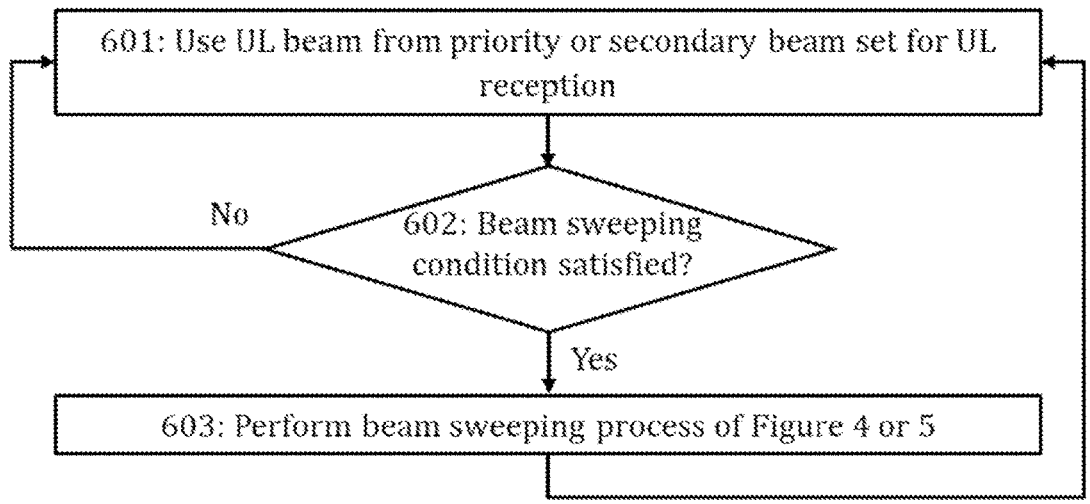

FIG. 6 illustrates another alternative process according to embodiments for performing UL beam selection using beam sweeping (or equally probing) at an access node using the priority beam set (and the secondary beam set). The process of FIG. 6 may be carried out by an apparatus (e.g., a computing device). The apparatus may be, be comprised in or communicatively connected to an access node (e.g., an access node 104 of FIG. 1). The apparatus carrying out the process of FIG. 6 may the same or different apparatus compared to the apparatus configured to perform the process of any of FIGS. 3 to 4.

Referring to FIG. 6, the apparatus initially causes, in block 601, the access node to operate using one of the UL beams defined either in the priority beam set or in the secondary beam set. During said operation, the apparatus determines, in block 602, whether one or more pre-defined beam sweeping conditions (i.e., one or more pre-defined conditions for initiating UL beam sweeping) are currently satisfied.

Said one or more pre-defined beam sweeping conditions may comprise one or more of the following:
 a pre-defined schedule for performing beam sweeping,
 a third pre-defined power threshold for power received using a current UL beam and/or
 one or more pre-defined criteria for detecting excessively rapid switching between two UL beams.

The pre-defined schedule may define, for example, a period for performing beam sweeping. The third pre-defined power threshold may correspond, for example, to the first pre-defined power threshold or the second pre-defined power threshold, as defined in connection with above embodiments. The one or more pre-defined criteria for detecting excessively rapid switching (so-called ping-ponging) between two UL beams may comprise, for example, a pre-defined threshold for the time between stopping the use of a particular UL beam and subsequent switching back to using said UL beam and/or a pre-defined threshold for the number of times the access node is allowed to switch directly between two UL beams in a row.

In response to at least one of the one or more pre-defined beam sweeping conditions being satisfied, the apparatus performs, in block 603, the UL beam selection using beam sweeping as described above in connection with FIG. 4 or 5. At least one of the one or more pre-defined beam sweeping conditions may be satisfied, in block 602, for example, if beam sweeping is scheduled is to take place at the current time according to said pre-defined schedule, if and. If multiple beam sweeping conditions are defined, only one of them may need to be satisfied for triggering the beam sweeping.

If none of the one or more pre-defined beam sweeping conditions are satisfied in block 601, the apparatus may continue to use the current UL beam (i.e., the process proceeds back to block 601).

The blocks, related functions, and information exchanges described above by means of FIGS. 2 to 6 are in no absolute chronological order, and some of them may be performed simultaneously or in an order differing from the given one. Other functions can also be executed between them or within them, and other information may be sent and/or received, and/or other mapping rules applied. Some of the blocks or part of the blocks or one or more pieces of information can also be left out or replaced by a corresponding block or part of the block or one or more pieces of information.

Figure 7:
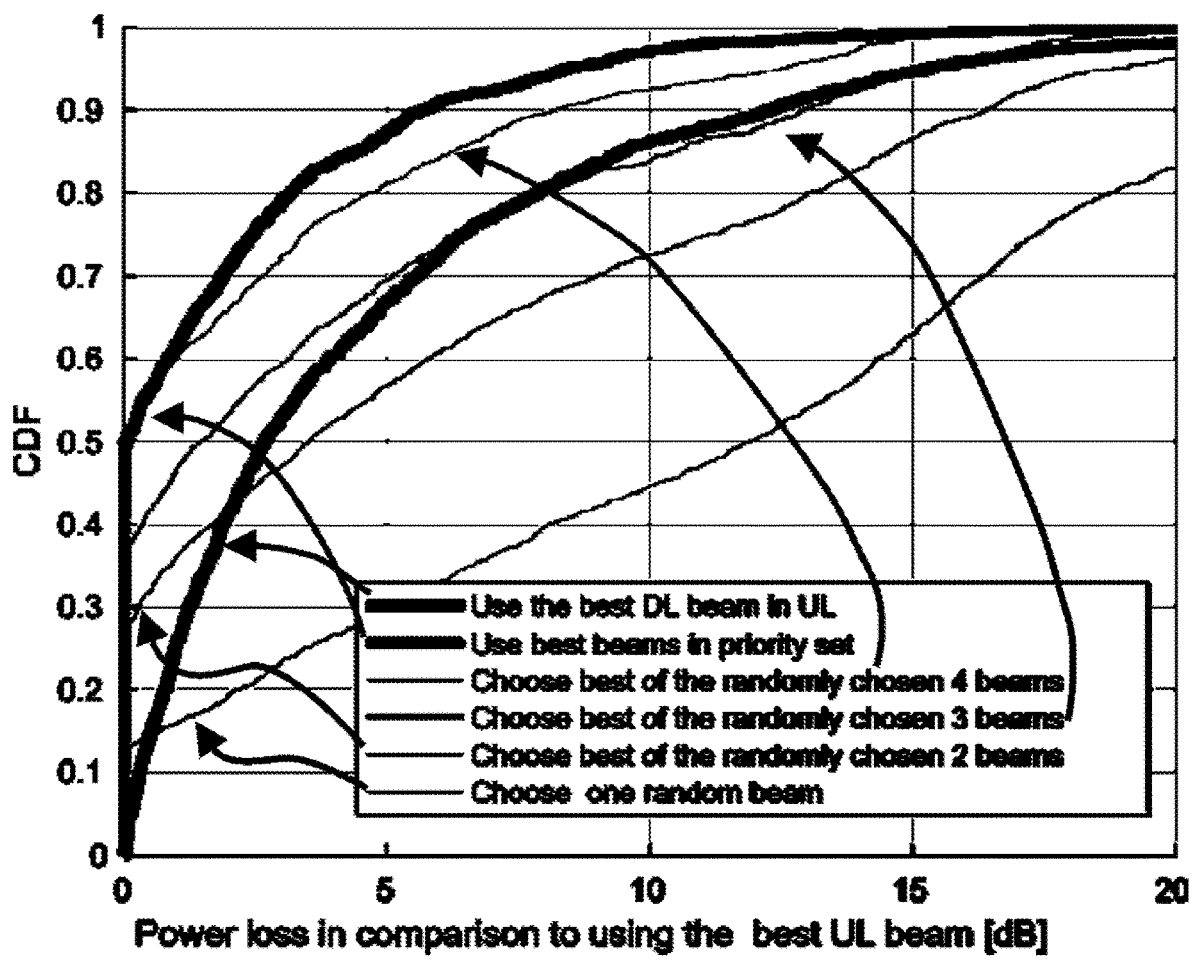
FIGS. 7 and 8 illustrate the performance of the uplink beam selection process according to embodiments compared to other uplink beam selection solutions.

The performance of the UL beam selection according to embodiments was tested in a Manhattan-like urban area of size 650 m×150 m along a street with both non-line-of-sight (NLOS) and line-of-sight (LOS) locations using ray tracing-based simulations with realistic antenna patterns. At 16% of the locations, a mismatch between the optimal DL beam and the optimal UL beam was observed. FIG. 7 shows a comparison of cumulative distribution functions (CDF) corresponding to five different ways of selecting the UL beam (listed in the order shown also in the legend of FIG. 7):
 1) selecting the UL beam corresponding to the optimal DL beam,
 2) selecting the UL beam as the best beam of the priority beam set according to embodiments (namely, as discussed in connection with FIG. 5),
 3) selecting the UL beam as the best beam of four randomly selected UL beams,
 4) selecting the UL beam as the best beam of three randomly selected UL beams,
 5) selecting the UL beam as the best beam of two randomly selected UL beams and
 6) selecting the UL beam randomly.

The solution according to embodiments clearly outperforms each of the alternative selection schemes. At high SNRs, the power loss for not using the best UL beam could be high but not necessarily so high as to considerably degrade the link quality. On average, only 1.34 additional beams needed to be swept after sweeping the UL beam corresponding to the optimal DL beam using the solution according to embodiments.

Figure 8:
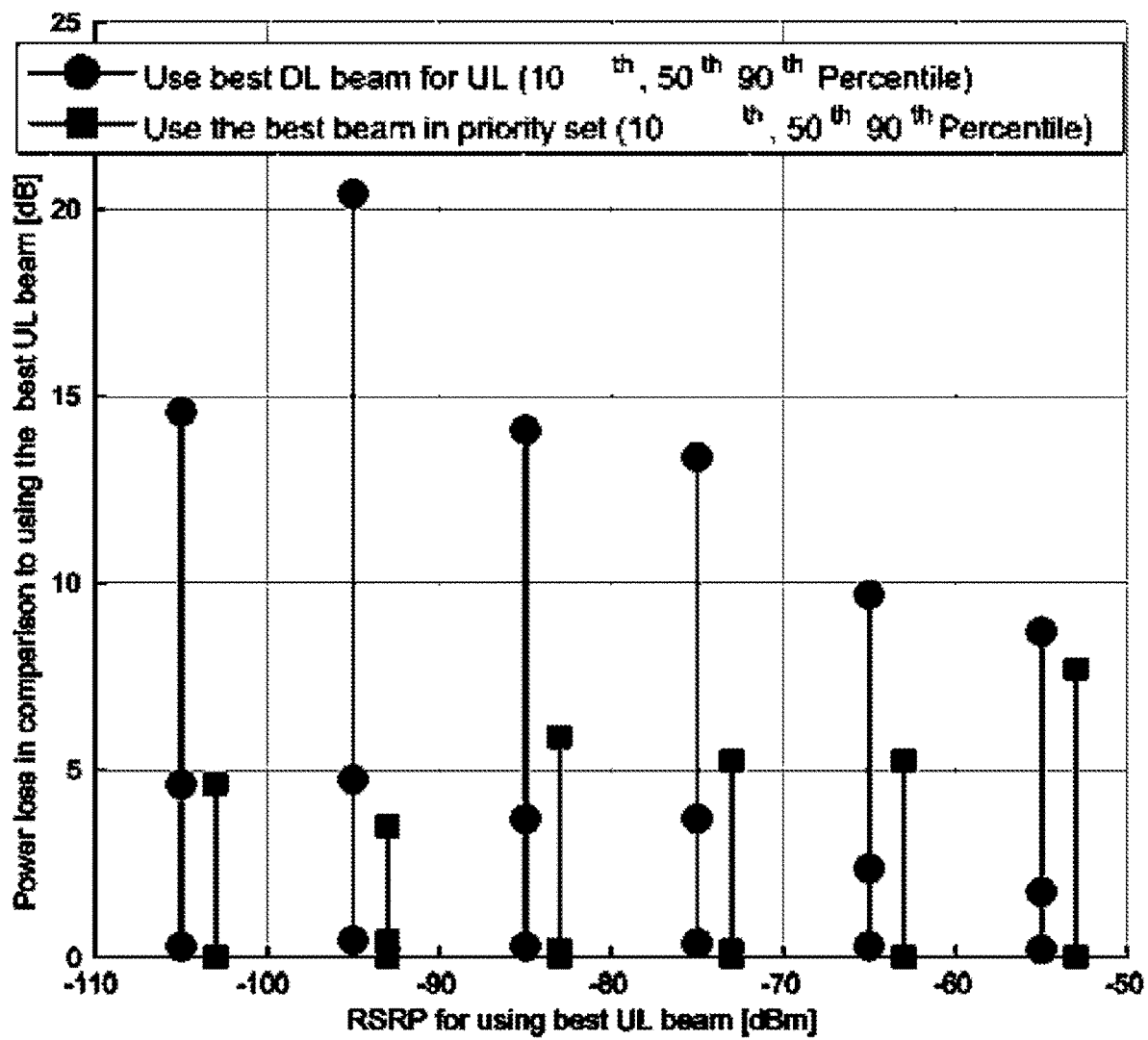

FIG. 8 shows the power loss in comparison to not using the best UL beam at every 10 dB SNR bin. Even at low SNR, the solution according to embodiments yields less than 5 dB power loss. If the optimal DL beam is used also as the UL beam in reception, this may result in up to 15 dB loss which may even be enough to cause outages.

As is known in the art, some reinforcement learning models may employ neural networks to, for example, to enable calculation of rewards when the exact dependency between a state and an action and a reward is not known analytically. In some embodiments, a neural network may be employed also here, instead on analytical solution, for calculating the reward for a given state and action. In such embodiments, the reward may be defined using a neural network which has been trained with training data comprising sets of state/action pairs and corresponding sets of rewards exhibiting desired behavior. The goal of a reinforcement learning may be to learn a policy which maximizes the expected reward or expected cumulative reward. Even in these embodiments, the brute-force approach may be employed (i.e., each reward for each action starting from a given state may be calculated, instead of using, e.g., a state-value function for more intelligent exploration).

Figure 9:
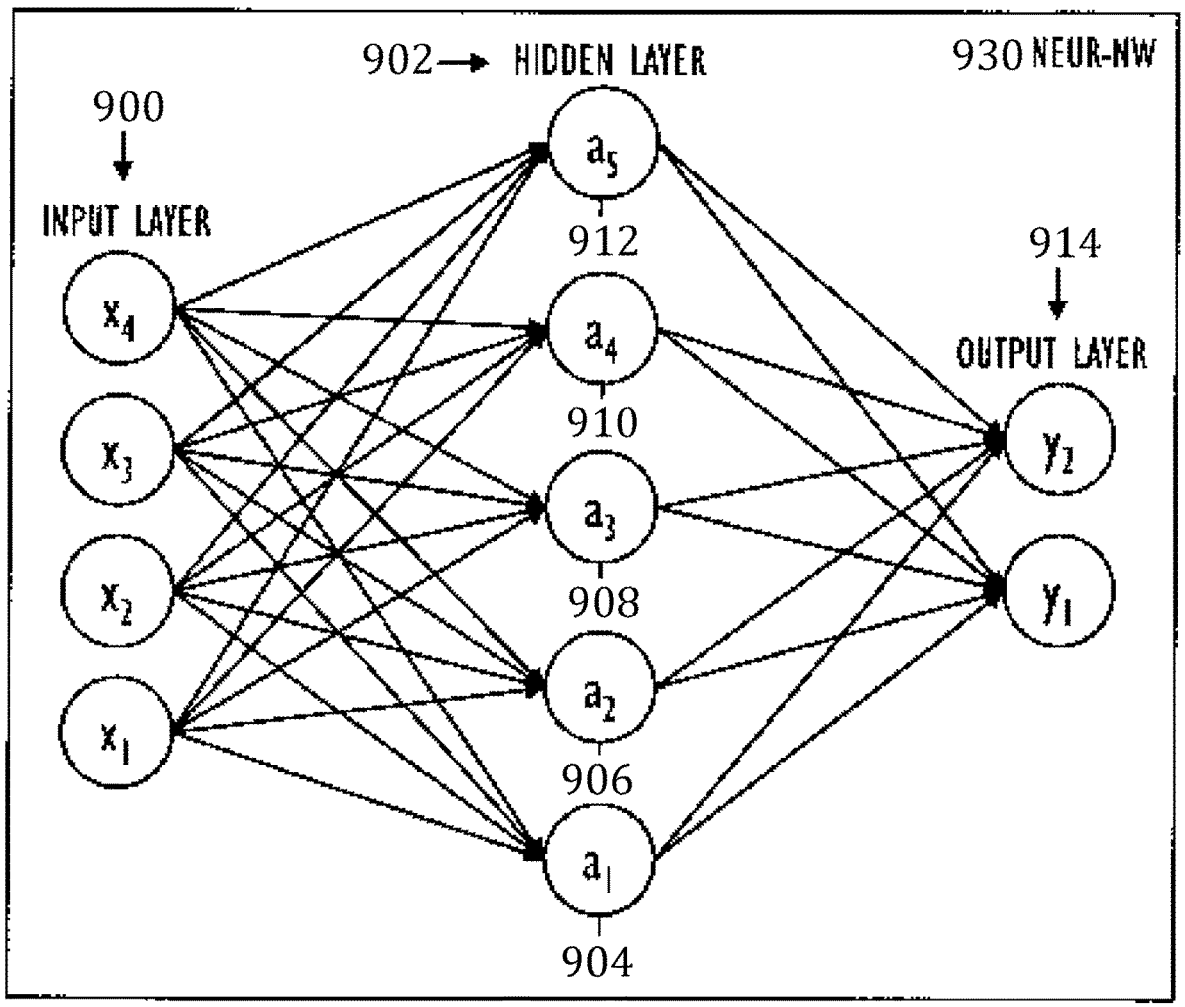
FIGS. 9 and 10 illustrate, respectively, a neural network with one hidden layer and a computational node. artificial neural networks which may be employed in some embodiments.
Figure 10:
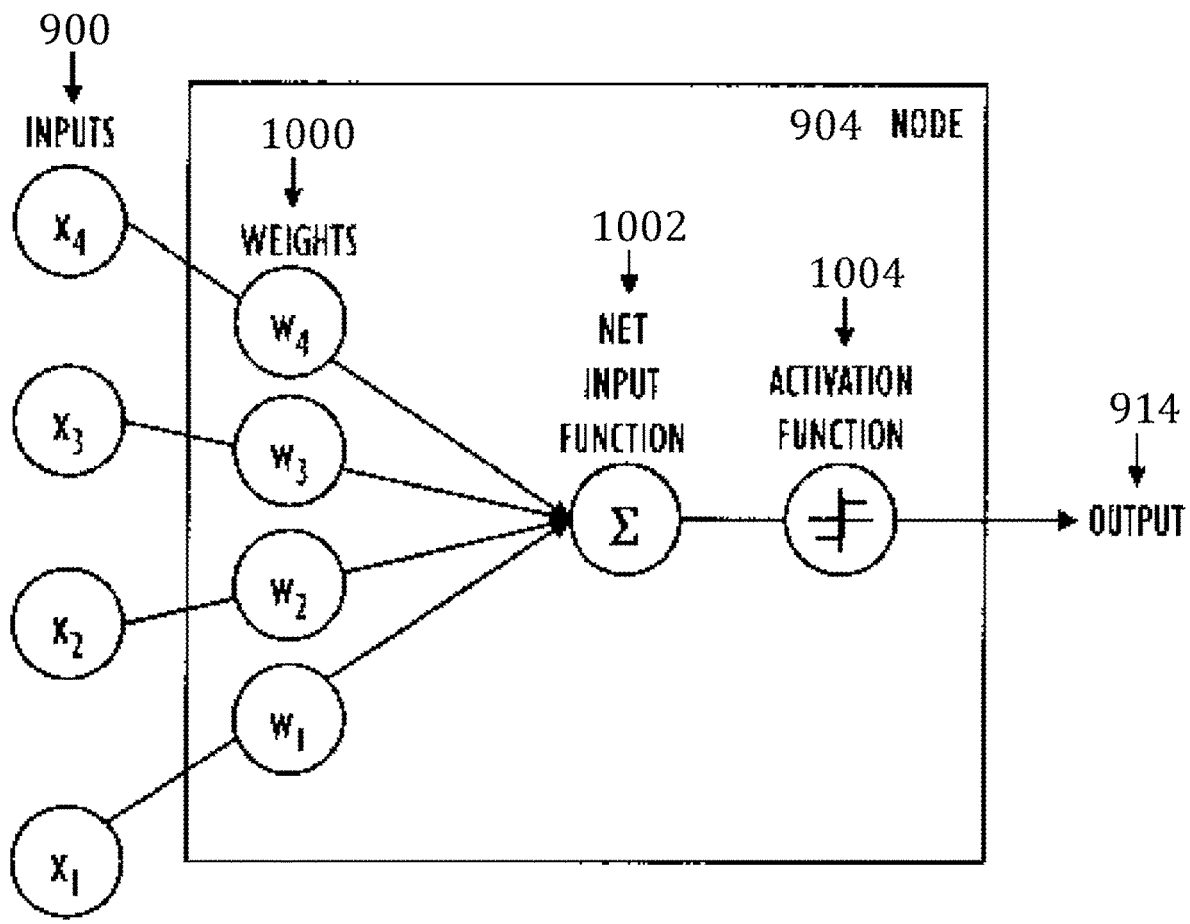

FIG. 9 illustrates an embodiment of a neural network with one hidden layer, and FIG. 10 illustrates an embodiment of a computational node.

Deep learning (also known as deep structured learning or hierarchical learning) is part of a broader family of machine learning methods based on the layers used in artificial neural networks. Reinforcement learning which uses a deep neural network (instead of explicitly defining the state space) is commonly called deep reinforcement learning.

An artificial neural network (ANN) 930 comprises a set of rules that are designed to execute tasks such as regression, classification, clustering, and pattern recognition. The ANNs achieve such objectives with a learning procedure, where they are shown various examples of input data, along with the desired output. With this, they learn to identify the proper output for any input within the training data manifold.

Learning by using labels is called supervised learning and learning without labels is called unsupervised learning. Deep (reinforcement) learning typically requires a large amount of input data.

A deep neural network (DNN) 930 is an artificial neural network comprising multiple hidden layers 902 between the input layer 900 and the output layer 914. Training of DNN allows it to find the correct mathematical manipulation to transform the input into the proper output even when the relationship is highly non-linear and/or complicated.

Each hidden layer 902 comprise nodes 904, 906, 908, 910, 912, where the computation takes place. As shown in FIG. 10, each node 904 combines input data 900 with a set of coefficients, or weights 1000, that either amplify or dampen that input 900, thereby assigning significance to inputs 900 with regard to the task the algorithm is trying to learn. The input-weight products are added 1002 and the sum is passed through an activation function 1004, to determine whether and to what extent that signal should progress further through the network 930 to affect the ultimate outcome, such as an act of classification. In the process, the neural networks learn to recognize correlations between certain relevant features and optimal results.

In the case of classification, the output of deep-learning network 930 may be considered as a likelihood of a particular outcome, such as in this case a probability of decoding success of a data packet. In this case, the number of layers 902 may vary proportional to the number of used input data 900. However, when the number of input data 900 is high, the accuracy of the outcome 914 is more reliable. On the other hand, when there are fewer layers 902, the computation might take less time and thereby reduce the latency. However, this highly depends on the specific DNN architecture and/or the computational resources.

Initial weights 1000 of the model can be set in various alternative ways. During the training phase they are adapted to improve the accuracy of the process based on analyzing errors in decision making. Training a model is basically a trial and error activity. In principle, each node 904, 906, 908, 910, 912 of the neural network 930 makes a decision (input*weight) and then compares this decision to collected data to find out the difference to the collected data. In other words, it determines the error, based on which the weights 1000 are adjusted. Thus, the training of the model may be considered a corrective feedback loop.

Typically, a neural network model is trained using a stochastic gradient descent optimization algorithm for which the gradients are calculated using the backpropagation algorithm. The gradient descent algorithm seeks to change the weights 1000 so that the next evaluation reduces the error, meaning the optimization algorithm is navigating down the gradient (or slope) of error. It is also possible to use any other suitable optimization algorithm if it provides sufficiently accurate weights 1000. Consequently, the trained parameters of the neural network 330 may comprise the weights 1000.

In the context of an optimization algorithm, the function used to evaluate a candidate solution (i.e., a set of weights) is referred to as the objective function. Typically, with neural networks, where the target is to minimize the error, the objective function is often referred to as a cost function or a loss function. In adjusting weights 1000, any suitable method may be used as a loss function, some examples are mean squared error (MSE), maximum likelihood (MLE), and cross entropy.

As for the activation function 1004 of the node 904, it defines the output 914 of that node 904 given an input or set of inputs 900. The node 904 calculates a weighted sum of inputs, perhaps adds a bias and then makes a decision as "activate" or "not activate" based on a decision threshold as a binary activation or using an activation function 1004 that gives a nonlinear decision function. Any suitable activation function 1004 may be used, for example sigmoid, rectified linear unit (ReLU), normalized exponential function (softmax), sotfplus, tanh, etc. In deep learning, the activation function 1004 is usually set at the layer level and applies to all neurons in that layer. The output 914 is then used as input for the next node and so on until a desired solution to the original problem is found.

Figure 11:
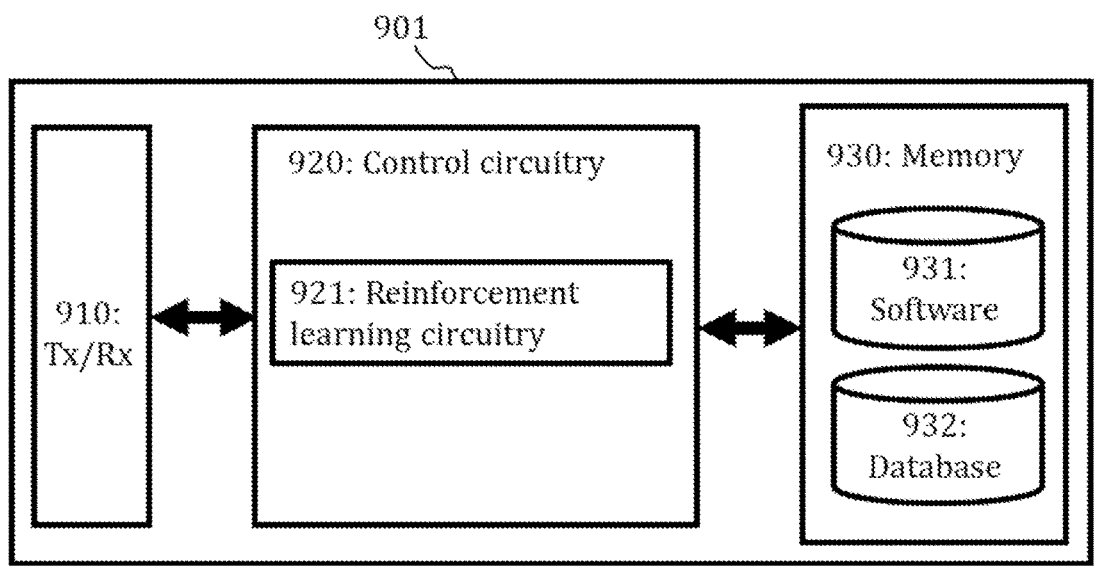
FIGS. 11 and 12 illustrate apparatuses according to embodiments.

FIG. 11 provides an apparatus 1101 (e.g., a computing device) according to some embodiments. FIG. 11 may illustrate an apparatus configured to carry out at least the functions described above in connection with deriving priority beam sets for an access node using a reinforcement learning model. The apparatus 1101 may comprise one or more communication control circuitry 1120, such as at least one processor, and at least one memory 1130, including one or more algorithms 1131, such as a computer program code (software) wherein the at least one memory and the computer program code (software) are configured, with the at least one processor, to cause, respectively, the apparatus to carry out any one of the exemplified functionalities relating to deriving priority beam sets for an access node using a reinforcement learning model as described above.

Referring to FIG. 11, the communication control circuitry 1120 of the apparatus 1101 comprises at least reinforcement learning circuitry 1121. The authorization circuitry 1121 may be configured to carry out at least some of the functionalities described above by means of any of FIGS. 2, 3, 9 and 10 using one or more individual circuitries.

The at least one memory 1130 may comprise at least one database 1132 which may comprise, for example, at least UL RSRP statistics for signals measured using a plurality of UL beams of an access node from a plurality of terminal devices and information on optimal DL beams of the access node for transmission to said plurality of terminal devices. Each memory 1130 may comprise software and at last one database. The memory 1130 may also comprise other databases which may not be related to the functionalities of the apparatus according to any of presented embodiments. The at least one memory 1130 may be implemented using any suitable data storage technology, such as semiconductor based memory devices, flash memory, magnetic memory devices and systems, optical memory devices and systems, fixed memory and removable memory.

Referring to FIG. 11, the apparatus 1101 may further comprise different interfaces 1110 such as one or more communication interfaces (TX/RX) comprising hardware and/or software for realizing communication connectivity over one or more communications network according to one or more communication protocols. Specifically, the one or more communication interfaces 1110 may provide the apparatus with communication capabilities to communicate in one or more mobile network and enable communication with one or more access nodes, one or more terminal devices (possibly via said plurality of access nodes) and/or one or more other network nodes or elements. The one or more communication interfaces 1110 may comprise standard well-known components such as an amplifier, filter, frequency-converter, analog-to-digital converts, (de)modulator, and encoder/decoder circuitries, controlled by the corresponding controlling units, and one or more antennas.

Figure 12:
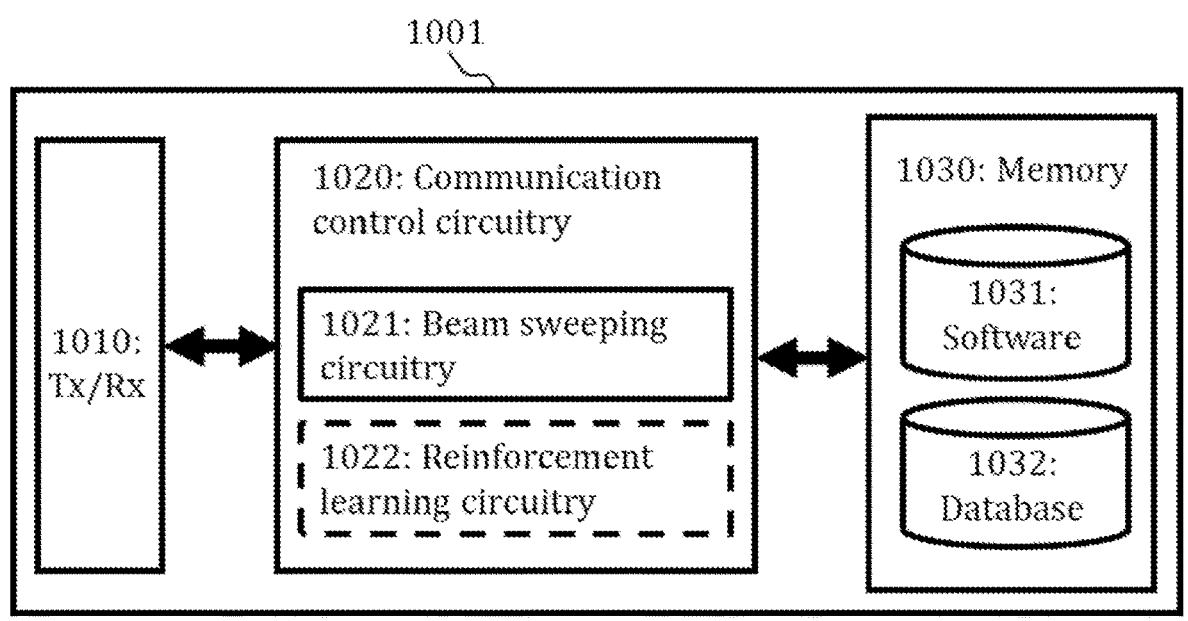

FIG. 12 provides an apparatus 1201 according to some embodiments. The apparatus 1201 may be an access node (e.g., the access node 104 of FIG. 1) or a part thereof. The apparatus 1201 may be configured to carry out at least the functions described above in connection with UL beam selection based on priority and secondary beam sets and optionally with deriving priority beam sets for an access node using a reinforcement learning model. The apparatus 1201 may comprise one or more communication control circuitry 1220, such as at least one processor, and at least one memory 1230, including one or more algorithms 1231, such as a computer program code (software) wherein the at least one memory and the computer program code (software) are configured, with the at least one processor, to cause, respectively, the apparatus to carry out any one of the exemplified functionalities of the access node described above.

Referring to FIG. 12, the communication control circuitry 1220 of the apparatus comprises at least beam sweeping circuitry 1221. The beam sweeping circuitry 1221 may be configured to carry out UL beam selection using beam sweeping according to embodiments and, to this end, to carry out at least some of the functionalities described above by means of any of FIGS. 4 to 6 using one or more individual circuitries. The communication control circuitry 1220 of the apparatus 1201 may optionally also comprise reinforcement learning circuitry 1221. The authorization circuitry 1221 may be configured to carry out at least some of the functionalities described above by means of any of FIGS. 2, 3, 9 and 10 using one or more individual circuitries.

The at least one memory 1230 may comprise at least one database 1232 which may comprise, for example, information on a plurality of priority beam sets associated with a plurality of downlink beams. Each memory 1230 may comprise software and at last one database. The at least one memory 1230 may also comprise other databases which may not be related to the functionalities of the apparatus according to any of presented embodiments. The at least one memory 1230 may be implemented using any suitable data storage technology, such as semiconductor based memory devices, flash memory, magnetic memory devices and systems, optical memory devices and systems, fixed memory and removable memory.

Referring to FIG. 12, the apparatus may further comprise different interfaces 1210 such as one or more communication interfaces (TX/RX) comprising hardware and/or software for realizing communication connectivity over one or more communications network according to one or more communication protocols. Specifically, the one or more communication interfaces 1210 may provide the apparatus with communication capabilities to enable communication with one or more terminal devices, one or more core network nodes, one or more other access node and/or an apparatus 1101 of FIG. 11. The one or more communication interfaces 1210 may comprise standard well-known component(s) such as an amplifier, filter, frequency-converter, analog-to-digital converts, (de)modulator, and encoder/decoder circuitries, controlled by the corresponding controlling units, and/or one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In embodiments, the at least one processor, the memory, and the computer program code form processing means or comprises one or more computer program code portions for carrying out one or more operations according to any one of the embodiments of FIGS. 2 to 6, 9 and 10 or operations thereof.

In an embodiment, at least some of the processes described in connection with of FIGS. 2 to 6, 9 and 10 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 6, 9 and 10 or operations thereof.

According to an aspect, there is provided an apparatus (e.g., a terminal device or a part thereof) comprising means for performing:

maintaining, in at least one memory or in an external memory, information on a priority beam set of one or more uplink beams of an access node, wherein the priority beam set is associated with a downlink beam of the access node;

determining an optimal beam for uplink reception from one or more terminal devices for which said downlink beam is used for transmission by performing the following:

causing performing beam sweeping, at the access node, with the one or more terminal devices using the priority beam set; and in response to a maximum received power measured for the priority beam set exceeding a first pre-defined power threshold following a completion of the beam sweeping of the priority beam set, selecting an uplink beam corresponding to the maximum received power measured for the priority beam set as the optimal beam.

According to an aspect, there is provided an apparatus (e.g., a computing device) comprising means for performing:

implementing, separately for at least one downlink beam of a plurality of downlink beams of the access node, a reinforcement learning model, wherein a state, an action and a reward of the reinforcement learning model for a downlink beam are defined as follows:

the state defines which of the plurality of uplink beams belong to a priority beam set for uplink reception from one or more source terminal devices for which said downlink beam is an optimal downlink beam, the action in a given state is defined as an addition of a new uplink beam of the plurality of uplink beams to the priority beam set, a removal of an uplink beam from the priority beam set or doing nothing, and the reward of taking a given action in a given state is calculated based on a change in uplink signal-to-noise ratio statistics of the one or more source terminal devices due to an action adjusted with a cost for taking the action; and calculating iteratively at least one optimal state defining at least one priority beam set using at least one reinforcement learning model based on uplink signal-to-noise ratio statistics derived or derivable from uplink reference signal received power statistics for signals measured using a plurality of uplink beams of the access node from a plurality of terminal devices and on a plurality of optimal downlink beams of the access node for transmission to said plurality of terminal devices.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof Embodiments of the methods described in connection with FIGS. 2 to 6, 9 and 10 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

A computer program stored in a computer-readable storage medium, the program comprising software code for performing the steps of:

determining an optimal beam for uplink reception from one or more terminal devices for which a downlink beam of an access node is used for transmission by performing the following:

causing performing beam sweeping, at the access node, with the one or more terminal devices using a priority beam set of one or more uplink beams of an access node, wherein the priority beam set is associated with the downlink beam; and in response to a maximum received power measured for the priority beam set exceeding a first pre-defined power threshold following a completion of the beam sweeping of the priority beam set, selecting an uplink beam corresponding to the maximum received power measured for the priority beam set as the optimal beam.

A computer readable storage medium having a computer program embodied therewith, wherein the computer program executable by a processor to cause the processor to perform a method:

implementing, separately for at least one downlink beam of a plurality of downlink beams of an access node, a reinforcement learning model, wherein a state, an action and a reward of the reinforcement learning model for a downlink beam are defined as follows:

the state defines which of the plurality of uplink beams belong to a priority beam set for uplink reception from one or more source terminal devices for which said downlink beam is an optimal downlink beam, the action in a given state is defined as an addition of a new uplink beam of the plurality of uplink beams to the priority beam set, a removal of an uplink beam from the priority beam set or doing nothing, and the reward of taking a given action in a given state is calculated based on a change in uplink signal-to-noise ratio statistics of the one or more source terminal devices due to an action adjusted with a cost for taking the action; and calculating iteratively at least one optimal state defining at least one priority beam set using at least one reinforcement learning model based on uplink signal-to-noise ratio statistics derived or derivable from uplink reference signal received power statistics for signals measured using a plurality of uplink beams of the access node from a plurality of terminal devices and on a plurality of optimal downlink beams of the access node for transmission to said plurality of terminal devices.

A computer program product embodied on a distribution medium readable by a computer and comprising program instructions which, when loaded into an apparatus, execute a method comprising:

determining an optimal beam for uplink reception from one or more terminal devices for which a downlink beam of an access node is used for transmission by performing the following:

causing performing beam sweeping, at the access node, with the one or more terminal devices using a priority beam set of one or more uplink beams of an access node, wherein the priority beam set is associated with the downlink beam; and in response to a maximum received power measured for the priority beam set exceeding a first pre-defined power threshold following a completion of the beam sweeping of the priority beam set, selecting an uplink beam corresponding to the maximum received power measured for the priority beam set as the optimal beam.

A computer program stored in a computer-readable storage medium, the program comprising software code for performing the steps of:

implementing, separately for at least one downlink beam of a plurality of downlink beams of an access node, a reinforcement learning model, wherein a state, an action and a reward of the reinforcement learning model for a downlink beam are defined as follows:
  the state defines which of the plurality of uplink beams belong to a priority beam set for uplink reception from one or more source terminal devices for which said downlink beam is an optimal downlink beam,
  the action in a given state is defined as an addition of a new uplink beam of the plurality of uplink beams to the priority beam set, a removal of an uplink beam from the priority beam set or doing nothing, and
  the reward of taking a given action in a given state is calculated based on a change in uplink signal-to-noise ratio statistics of the one or more source terminal devices due to an action adjusted with a cost for taking the action; and
calculating iteratively at least one optimal state defining at least one priority beam set using at least one reinforcement learning model based on uplink signal-to-noise ratio statistics derived or derivable from uplink reference signal received power statistics for signals measured using a plurality of uplink beams of the access node from a plurality of terminal devices and on a plurality of optimal downlink beams of the access node for transmission to said plurality of terminal devices.

A computer readable storage medium having a computer program embodied therewith, wherein the computer program executable by a processor to cause the processor to perform a method:

determining an optimal beam for uplink reception from one or more terminal devices for which a downlink beam of an access node is used for transmission by performing the following:
  causing performing beam sweeping, at the access node, with the one or more terminal devices using a priority beam set of one or more uplink beams of an access node, wherein the priority beam set is associated with the downlink beam; and
  in response to a maximum received power measured for the priority beam set exceeding a first pre-defined power threshold following a completion of the beam sweeping of the priority beam set, selecting an uplink beam corresponding to the maximum received power measured for the priority beam set as the optimal beam.

A computer program product embodied on a distribution medium readable by a computer and comprising program instructions which, when loaded into an apparatus, execute a method comprising:

implementing, separately for at least one downlink beam of a plurality of downlink beams of an access node, a reinforcement learning model, wherein a state, an action and a reward of the reinforcement learning model for a downlink beam are defined as follows:
  the state defines which of the plurality of uplink beams belong to a priority beam set for uplink reception from one or more source terminal devices for which said downlink beam is an optimal downlink beam,
  the action in a given state is defined as an addition of a new uplink beam of the plurality of uplink beams to the priority beam set, a removal of an uplink beam from the priority beam set or doing nothing, and
  the reward of taking a given action in a given state is calculated based on a change in uplink signal-to-noise ratio statistics of the one or more source terminal devices due to an action adjusted with a cost for taking the action; and
calculating iteratively at least one optimal state defining at least one priority beam set using at least one reinforcement learning model based on uplink signal-to-noise ratio statistics derived or derivable from uplink reference signal received power statistics for signals measured using a plurality of uplink beams of the access node from a plurality of terminal devices and on a plurality of optimal downlink beams of the access node for transmission to said plurality of terminal devices.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor; and
at least one memory storing instructions to be executed by the at least one processor, wherein the at least one memory and the instructions are configured to, with the at least one processor, cause the apparatus at least to perform:
implementing, separately for at least one downlink beam of a plurality of downlink beams of an access node, a reinforcement learning model, wherein a state, an action and a reward of the reinforcement learning model for a downlink beam are defined as follows:
  the state defines which of the plurality of uplink beams belong to a priority beam set for uplink reception from one or more source terminal devices for which said downlink beam is an optimal downlink beam,
  the action in a given state is defined as an addition of a new uplink beam of the plurality of uplink beams to the priority beam set, a removal of an uplink beam from the priority beam set or doing nothing, and
  the reward of taking a given action in a given state is calculated based on a change in uplink signal-to-noise ratio statistics of the one or more source terminal devices due to an action adjusted with a cost for taking the action; and
calculating iteratively at least one optimal state defining at least one priority beam set using at least one reinforcement learning model based on uplink signal-to-noise ratio statistics derived or derivable from uplink reference signal received power statistics for signals measured using a plurality of uplink beams of the access node from a plurality of terminal devices and on a plurality of optimal downlink beams of the access node for transmission to said plurality of terminal devices.

2. The apparatus of claim 1, wherein the at least one memory and the instructions are further configured to, with the at least one processor, cause the apparatus to perform, following generation of the at least one priority beam set:
  maintaining, in said at least one memory or in an external memory, information on a priority beam set of one or more uplink beams of the access node, wherein the priority beam set is associated with a downlink beam of the access node, the priority beam set being one of said at least one priority beam set;
  determining an optimal beam for uplink reception from one or more terminal devices for which said downlink beam is used for transmission by performing the following:
    causing performing beam sweeping, at the access node, with the one or more terminal devices using the priority beam set; and
    in response to a maximum received power measured for the priority beam set exceeding a first pre-defined power threshold following a completion of the beam sweeping of the priority beam set, selecting an uplink beam corresponding to the maximum received power measured for the priority beam set as the optimal beam.

3. The apparatus of claim 2, wherein the at least one memory and the instructions are further configured to, with the at least one processor, cause the apparatus to perform:
  maintaining, in said at least one memory or in the external memory, information on a secondary beam set of one or more uplink beams of the access node, wherein the secondary beam set is associated with said downlink beam of the access node; and
  performing the determining of the optimal beam for uplink reception further by:
    in response to the maximum received power measured for the priority beam set failing to exceed the first pre-defined power threshold, causing performing beam sweeping, at the access node, with the one or more terminal devices using the secondary beam set; and
    in response to a maximum received power measured for an uplink beam in the secondary beam set exceeding the first pre-defined power threshold, selecting the uplink beam of the secondary beam set corresponding to the maximum received power measured as the optimal beam.

4. The apparatus of claim 3, wherein the determining of the optimal beam for uplink reception further comprises:
  in response to a maximum received power measured for an uplink beam in the priority beam set exceeding a second pre-defined power threshold during the beam sweeping of the priority beam set, stopping the beam sweeping of the priority beam set and selecting said uplink beam of the priority beam set as the optimal beam, wherein the second pre-defined power threshold is higher than the first pre-defined power threshold; and
  performing the selecting of the uplink beam corresponding to the maximum received power measured for the priority beam set as the optimal beam in response to the maximum received power measured for the priority beam set failing to exceed the second pre-defined power threshold but exceeding the first pre-defined power threshold following the completion of the beam sweeping of the priority beam set.

5. The apparatus of claim 3, wherein the at least one memory and the instructions are further configured to, with the at least one processor, cause the apparatus to perform:
  in response to detecting, during the beam sweeping of secondary beam set, that the maximum received power measured for the uplink beam in the secondary beam set exceeds the first pre-defined power threshold, stopping the beam sweeping of the secondary beam set and performing the selecting of the uplink beam of the secondary beam set corresponding to the maximum received power measured for the secondary beam set as the optimal beam.

6. The apparatus according to claim 3, wherein the at least one memory and the instructions are further configured to, with the at least one processor, cause the apparatus to perform:
  maintaining, in said at least one memory or the external memory, information on a plurality of priority beam sets of one or more uplink beams and a plurality of secondary beam sets of one or more uplink beams of the access node, wherein the plurality of priority and secondary beam sets are associated with a respective plurality of downlink beams; and
  performing the determining of the optimal beam for uplink reception for a plurality of downlink beams based on the plurality of priority and secondary beam sets separately.

7. The apparatus according to claim 2, wherein the at least one memory and the instructions are further configured to, with the at least one processor, cause the apparatus to perform:
  determining whether one or more pre-defined beam sweeping conditions for initiating uplink beam sweeping are satisfied; and
  causing the determining of the optimal beam in response to at least one of the one or more pre-defined beam sweeping conditions being satisfied.

8. The apparatus of claim 7, wherein the one or more pre-defined beam sweeping conditions define a pre-defined schedule for performing beam sweeping, a third pre-defined power threshold for power received using a current uplink beam and/or one or more pre-defined criteria for detecting excessively rapid switching between two uplink beams.

9. The apparatus according to claim 1, wherein the at least one memory and the instructions are further configured to, with the at least one processor, cause the apparatus to perform:
  causing transmission of information on said at least one optimized state to the access node.

10. The apparatus according to claim 1, wherein the at least one memory and the instructions are further configured to, with the at least one processor, cause the apparatus to perform:
  maintaining, in said at least one memory or an external memory, said uplink reference signal received power statistics for signals measured using said plurality of uplink beams of the access node from the plurality of terminal devices or said uplink signal-to-noise ratio statistics derivable from said uplink reference signal received power statistics and information on said plurality of optimal downlink beams of the access node for transmission to said plurality of terminal devices.

11. The apparatus according to claim 1, wherein, in said at least one reinforcement learning model, an action defining an addition of a new uplink beam of the plurality of uplink beams to the priority beam set is associated with a positive cost, an action defining a removal of an uplink beam from the priority beam set is associated with a negative cost and an action defining doing nothing is associated with a zero cost.

12. The apparatus according to claim 1, wherein, in said at least one reinforcement learning model, said change in the uplink signal-to-noise ratio statistics is defined as a dB-difference between Ath percentile signal-to-noise ratios after and before taking the action or as a sum or a weighted sum of a plurality of dB-differences between signal-to-noise ratios after and before taking the action calculated for different percentiles, A being a positive real number.

13. The apparatus according to claim 1, wherein the calculating for a reinforcement learning model of said at least one reinforcement learning model comprises performing:
defining an initial state as a random state or using one or more pre-defined criteria,
repeating the following, starting from the initial state, until the highest reward of a plurality of calculated rewards is zero:
calculating, for a plurality of actions from a state, the plurality of rewards using the reinforcement learning model for a given downlink beam based on uplink signal-to-noise ratio statistics of one or more source terminal devices for which the given downlink beam is the optimal downlink beam derived from said reference signal receiver power statistics and
in response to the highest reward of the plurality of rewards being positive, executing an action of the plurality of actions associated with the highest reward so as to define a new state.

14. The apparatus of claim 13, wherein the calculating of the plurality of rewards comprises:
determining uplink signal-to-noise ratio statistics for the state and a plurality of new states resulting from performing of the plurality of actions based on uplink reference signal received power statistics for the state and the plurality of new states, wherein the uplink reference signal received power statistics for the state and the plurality of new states are limited to statistics relating to the one or more source terminal devices; and
calculating the plurality of rewards based on a change in the uplink signal-to-noise ratio statistics between the current state and the plurality of new states adjusted with the cost for taking the action.

15. The apparatus according to claim 1, wherein, in said at least one reinforcement learning model, the state is defined as a binary vector having a length equal to the number of the plurality of uplink beams producible by the access node.

16. The apparatus according to claim 1, wherein the reward for adding an uplink beam, for removing an uplink beam and for doing nothing is defined as $$R^n = \sum_{j=1}^{J}(\delta_j \Delta SNR_j[\text{dB}]) - \gamma[\text{dB}],$$

where $$\begin{cases} \gamma > 0 \text{ for adding an uplink beam} \\ \gamma < 0 \text{ for removing an uplink beam} \\ \gamma = 0 \text{ for doing nothing.} \end{cases}$$

and J is a positive integer, $\delta_j$ are pre-defined positive scaling factors, $\Delta SNR_j$ define dB-differences of signal-to-noise ratios after and before taking the action for different percentiles of the uplink signal-to-noise ratio statistics and $\gamma$ is the cost for taking the action.

17. The apparatus of claim 16, wherein J is equal to 2.

18. A method, comprising:
implementing, separately for at least one downlink beam of a plurality of downlink beams of the access node, a reinforcement learning model, wherein a state, an action and a reward of the reinforcement learning model for a downlink beam are defined as follows:
the state defines which of the plurality of uplink beams belong to a priority beam set for uplink reception from one or more source terminal devices for which said downlink beam is an optimal downlink beam,
the action in a given state is defined as an addition of a new uplink beam of the plurality of uplink beams to the priority beam set, a removal of an uplink beam from the priority beam set or doing nothing, and
the reward of taking a given action in a given state is calculated based on a change in uplink signal-to-noise ratio statistics of the one or more source terminal devices due to an action adjusted with a cost for taking the action; and
calculating iteratively at least one optimal state defining at least one priority beam set using at least one reinforcement learning model based on uplink signal-to-noise ratio statistics derived or derivable from uplink reference signal received power statistics for signals measured using a plurality of uplink beams of the access node from a plurality of terminal devices and on a plurality of optimal downlink beams of the access node for transmission to said plurality of terminal devices.

19. A non-transitory computer readable medium encoded with program instructions that, when executed in hardware, cause the hardware to perform:
implementing, separately for at least one downlink beam of a plurality of downlink beams of an access node, a reinforcement learning model, wherein a state, an action and a reward of the reinforcement learning model for a downlink beam are defined as follows:
the state defines which of the plurality of uplink beams belong to a priority beam set for uplink reception from one or more source terminal devices for which said downlink beam is an optimal downlink beam,
the action in a given state is defined as an addition of a new uplink beam of the plurality of uplink beams to the priority beam set, a removal of an uplink beam from the priority beam set or doing nothing, and
the reward of taking a given action in a given state is calculated based on a change in uplink signal-to-noise ratio statistics of the one or more source terminal devices due to an action adjusted with a cost for taking the action; and
calculating iteratively at least one optimal state defining at least one priority beam set using at least one reinforcement learning model based on uplink signal-to-noise ratio statistics derived or derivable from uplink reference signal received power statistics for signals measured using a plurality of uplink beams of the access node from a plurality of terminal devices and on a plurality of optimal downlink beams of the access node for transmission to said plurality of terminal devices.

* * * * *